US010098085B1

(12) United States Patent
Overcash

(10) Patent No.: US 10,098,085 B1
(45) Date of Patent: Oct. 9, 2018

(54) DETECTING A LOCATION OF A WIRELESS DEVICE

(71) Applicant: Cisco Technology, Inc., San Jose, CA (US)

(72) Inventor: Michael Overcash, Lawrenceville, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/613,438

(22) Filed: Jun. 5, 2017

(51) Int. Cl.
*H04W 64/00* (2009.01)
*H04B 7/08* (2006.01)
*H04W 16/28* (2009.01)
*H04B 7/155* (2006.01)

(52) U.S. Cl.
CPC .......... *H04W 64/003* (2013.01); *H04B 7/086* (2013.01); *H04W 16/28* (2013.01); *H04B 7/1555* (2013.01)

(58) Field of Classification Search
CPC . H04W 64/003; H04W 7/086; H04W 7/1555; H04W 16/28
See application file for complete search history.

(56) References Cited

U.S. PATENT DOCUMENTS

| 6,369,756 B1* | 4/2002 | Wang | H04B 7/0615 342/367 |
| 6,512,481 B1* | 1/2003 | Velazquez | G01S 19/06 342/357.64 |
| 9,823,330 B2* | 11/2017 | Hart | G01S 3/38 |
| 2014/0327579 A1* | 11/2014 | Hart | G01S 3/48 342/374 |
| 2015/0173038 A1* | 6/2015 | Quan | H04W 64/00 455/456.5 |
| 2018/0035396 A1* | 2/2018 | Stirling-Gallacher | H04B 7/028 |

OTHER PUBLICATIONS

Brian D. Jeffs, "Beamforming, A Brief Introduction," Department of Electrical and Computer Engineering, Brigham Young University, Oct. 2004, 14 pgs.

* cited by examiner

*Primary Examiner* — Khai M Nguyen
(74) *Attorney, Agent, or Firm* — Merchant & Gould P.C.

(57) ABSTRACT

A location of a client device may be detected. From a first location, a first angle from a first reference line to the client device may be determined using beamforming. Next, from a second location, a second angle from a second reference line to the client device may be determined using beamforming. The first reference line and the second reference line may be parallel. Then, an intersection point of a first directional line and a second directional line may be determined. The first directional line may be defined by the first location and the first angle. The second directional line may be defined by the second location and the second angle. A client device location corresponding to the intersection point may then be obtained.

16 Claims, 6 Drawing Sheets

DETECTING A LOCATION OF A WIRELESS DEVICE

TECHNICAL FIELD

The present disclosure relates generally to detecting a location of a wireless device.

BACKGROUND

A wireless access point (AP) is a networking hardware device that allows a Wi-Fi compliant client device to connect to a wired network. Wi-Fi is a technology for wireless local area networking with devices based on the IEEE 802.11 standards. The AP connects to a router (via a wired network) as a standalone device, but it can also be an integral component of the router itself. An AP is differentiated from a hotspot, which is the physical location where Wi-Fi access to a WLAN is available.

Prior to wireless networks, setting up a computer network in a business, home or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the WAP then provides wireless connections using radio frequency links for other devices to utilize that wired connection.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
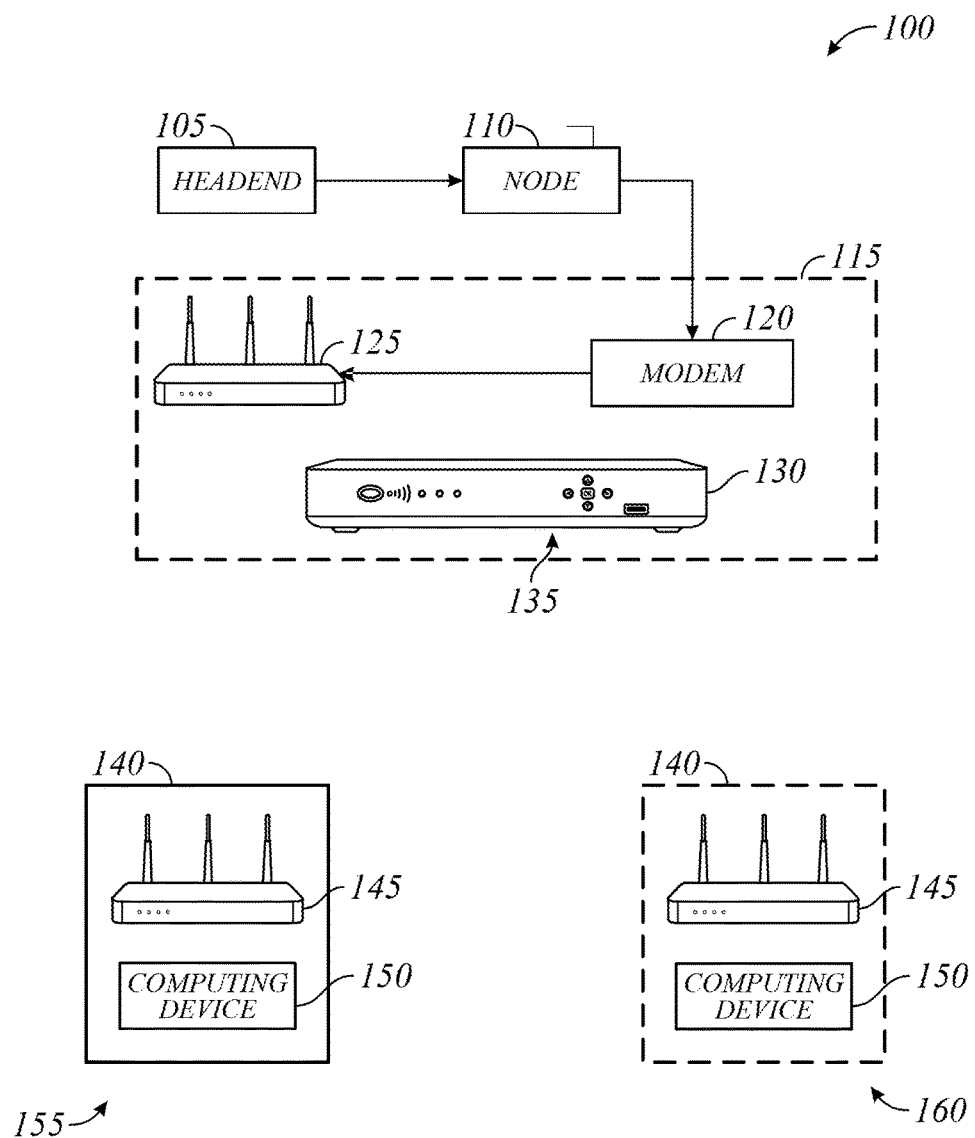
FIG. 1 is a block diagram of a communication system.

A location of a client device may be detected. From a first location, a first angle from a first reference line to the client device may be determined using beamforming. Next, from a second location, a second angle from a second reference line to the client device may be determined using beamforming. The first reference line and the second reference line may be parallel. Then, an intersection point of a first directional line and a second directional line may be determined. The first directional line may be defined by the first location and the first angle. The second directional line may be defined by the second location and the second angle. A client device location corresponding to the intersection point may then be obtained.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A user may pay for video services from a service provider. These video services may include the service provider supplying the user with one or more user devices (e.g., set-top boxes) upon which the user may receive these video services from the service provider at an authorized location (e.g., an address). In some cases, however, there may be an unauthorized economic incentive for the user to relocate one or more of the supplied user devices from the authorized service location to some other unauthorized service location or locations. An example may comprise, but is not limited to, the user obtaining a user device authorized for residential service at an authorized location (e.g., a home), and then relocating the obtained user device to an unauthorized non-residential service location (e.g., a business, a sports bar, etc.) for public commercial use. Another example may comprise, but is not limited to, the user obtaining multiple user devices from the service provider for authorized residential service at a certain residential location and then the user leasing the obtained user devices to others (e.g., friends or neighbors) at unauthorized locations (e.g., unauthorized residential locations).

In both of the aforementioned examples, the incentive for the unauthorized use by the user may be economic. In the first example, monthly fees for the unauthorized public commercial use may be much higher than the authorized residential fees. Similarly, in the second example, the authorized service fee to the user for adding a second or third authorized user device at the authorized location may be much less than the fees for establishing new residential services from the service provider at the locations for the unauthorized friends or neighbors. Accordingly, embodiments of the disclosure may determine a location of user devices (e.g., wireless-enabled user devices) and, in turn, detect the aforementioned unauthorized use.

Consistent with embodiments of the disclosure, a vehicle (e.g., a van, truck, drone, etc.) equipped with a locator device that may use directional multi-antenna beamforming techniques to determine a direction of a client device. Directional multi-antenna beamforming may comprise a technique to achieve directional radio frequency (RF) gain in a multi-antenna array by accounting for propagation delays. The client device may be placed in a special "hunt mode" or "search mode" where it may attempt to associate with the locator device. The client device may be associated, for example, with a WiFi access point (e.g., a customer access point) for internet or other WAN access, and may act as a WiFi client to this access point. Consistent with embodiments of the disclosure, hunt mode may not cause a sustained interruption to normal connectivity. For example, even in the hunt mode, the client device may remain connected to the customer access point.

The vehicle may move around causing the locator device to come into range of the client device. The locator device may use a software application that may report the direction and signal strength of the client device. When the client device is located (e.g., based, for example, on triangulation of its detected direction), its actual location may be compared to an address in a billing system associated with the service provider in order to determine if the detected actual location is authorized by the service provider for the client device or not.

FIG. 1 is a block diagram of a communication system 100. As shown in FIG. 1, communication system 100 may comprise a headend 105, a node 110, a customer premises equipment (CPE) 115. Customer premises equipment 115 may comprise a modem 120, a customer access point (AP) 125, and a client device 130. Client device 130 may be located at a client device location 135.

Headend 105 may comprise, but is not limited to, a cable television headend that may comprise a master facility for receiving television signals for processing and distribution over a cable television system. Node 110 may receive signals from headend 105 via fiber optic cable and pass the signals to CPE 115.

Customer premises equipment 115 may comprise, for example, any terminal and associated equipment located at a subscriber's premises and connected with a service provider's telecommunication channel at a demarcation point. Modem 120 may comprise a cable modem that may provide bi-directional data communication via radio frequency channels on a hybrid fibre-coaxial (HFC) and/or radio frequency over glass (RFoG) infrastructure. Customer access point 125 may comprise, for example, a Wi-Fi compliant device that may allow client device 130 to connect to a wired network (e.g., the Internet). Client device 130 may comprise, but is not limited to, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

As shown in FIG. 1, communication system 100 may further include a locator device 140. Locator device 140 may comprise a locator access point 145 and a computing device 150. Locator access point 145, for example, may comprise a Wi-Fi compliant device that may allow client device 130 to connect to a computing device 150. Computing device 150 may be described in greater detail below with respect to FIG. 6.

Consistent with embodiments of the disclosure, a vehicle may carry locator device 140 that may use directional multi-antenna beamforming techniques to determine a direction of client device 130. Client device 130 may be placed in a special "hunt mode" or "search mode" where it may attempt to associate with locator device 140. Consistent with embodiments of the disclosure, hunt mode may not cause a sustained interruption to normal connectivity. For example, even in the hunt mode, client device 130 may remain connected to customer access point 125. The vehicle may move around causing locator device 140 to come into range of client device 130. Locator device 140 may use a software application that may determine the direction and signal strength of client device 130. When client device 130 is located (e.g., based, for example, on triangulation of its detected direction), its actual location may be compared to an address in a billing system associated with the service provider in order to determine if the detected actual location is authorized by the service provider for client device 130 or not.

Figure 2:
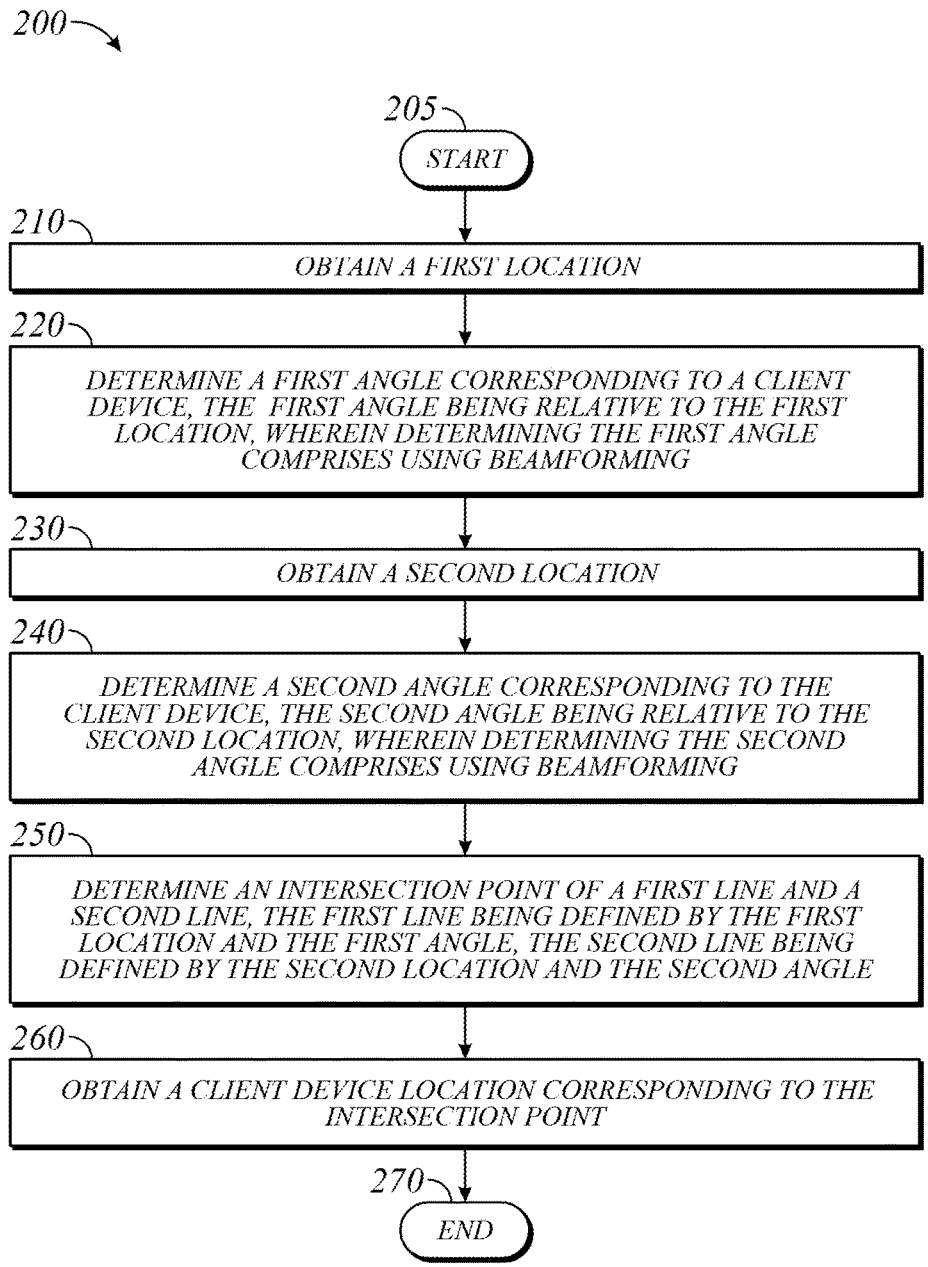
FIG. 2 is a flow chart of a method for detecting a location of a wireless device.

FIG. 2 is a flow chart setting forth the general stages involved in a method 200 consistent with an embodiment of the disclosure for detecting a location of a wireless device. Method 200 may be implemented using a computing device 150 as described in more detail above with respect to FIG. 1. Ways to implement the stages of method 200 will be described in greater detail below.

Figure 3:
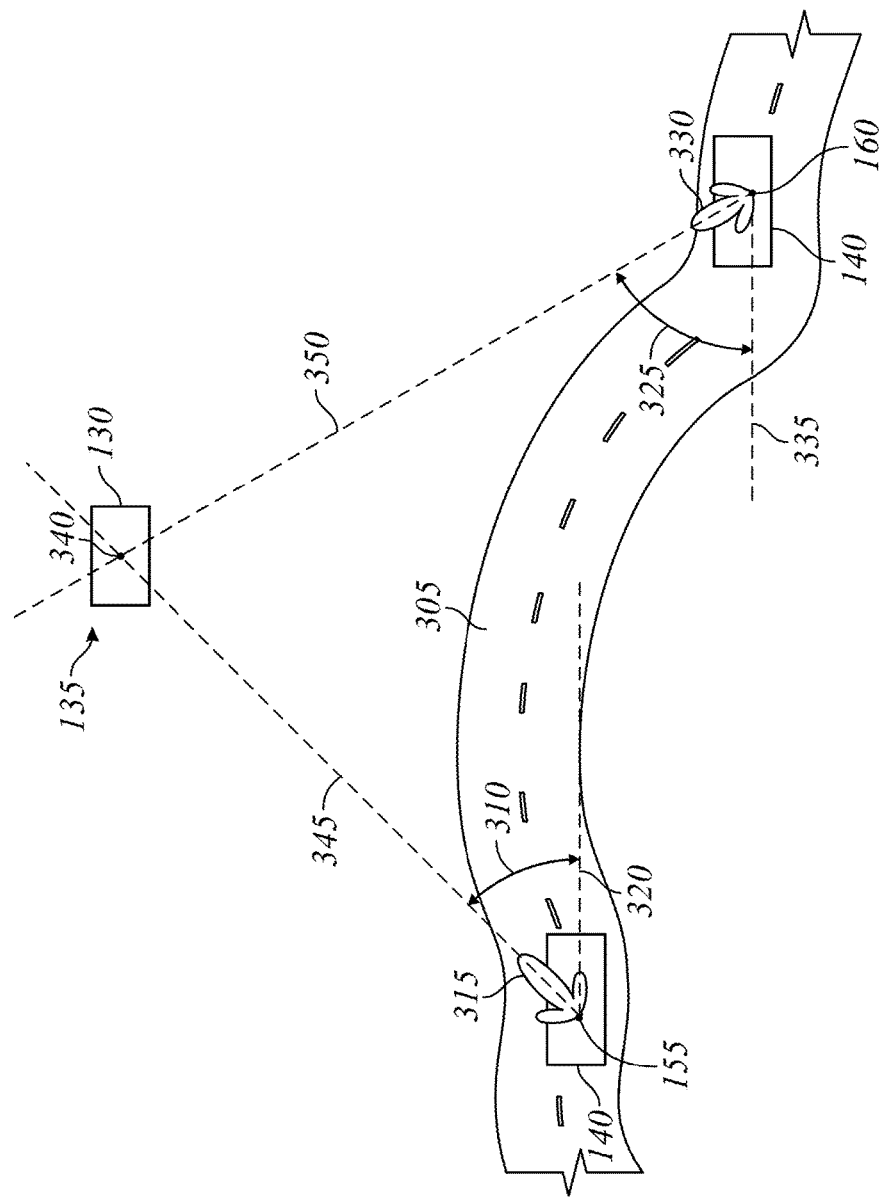
FIG. 3 is a block diagram of an operating environment.

Method 200 may begin at starting block 205 and proceed to stage 210 where computing device 150 may obtain first location 155. For example, as illustrated in FIG. 3, a vehicle may move locator device 140 down a neighborhood street 305. Client device 130 may be placed in a "hunt mode" where it may attempt to associate with locator access point 145. For example, headend 105 may send instructions (through node 110, modem 120, and customer access point 125) to client device 130 to associate with locator access point 145. The instructions may specify a Service Set identifier (SSID) of locator access point 145. Headend 105 may send the aforementioned instructions in response to a request from computing device 150 to do so. When locator device 140 comes in range of client device 130 while client device 130 is in hunt mode, client device 130 may associate with locator access point 145. Locator access point 145 may identify client device 130 based on client device 130's client Media Access Control (MAC) address or other unique identifiers, for example, that client device 130 may supply to locator access point 145 when client device 130 associates with locator access point 145.

Once client device 130 associates with locator access point 145, the vehicle moving locator device 140 may stop and the location of locator access point 145 may be determined. As shown in FIG. 3, the location of locator access point 145 may comprise first location 155. The location of locator access point 145 may correspond to a center of locator access point 145's multi-antenna array. The location (i.e., first location 155) may be determined in terms of, but is not limited to, Global Positioning System (GPS) coordinates. Computing device 150 may use a GPS tracking unit that uses the Global Positioning System to determine and track the location, for example, the center of locator access point 145's multi-antenna array.

From stage 210, where computing device 150 obtains first location 155, method 200 may advance to stage 220 where computing device 150 may determine a first angle 310 corresponding to client device 130. First angle 310 may be relative to first location 155 and may be determined using beamforming. Beamforming is a process that performs adaptive spatial signal processing with an array of transmitters or receivers. Signals from the array may be combined in a manner that increases the signal strength to and from a particular desired direction while signals to and from other directions may be combined destructively. This results in degradation of the signal to and from the undesired direction, while increasing the signal in the desired direction.

With locator access point 145 stationary, locator access point 145 may apply beamforming using its multi-antenna array to establish a first gain pattern 315 that increases the signal strength of locator access point 145 to and from a direction toward client device 130. Using an iterative process, locator access point 145 may test a number of different angles for first gain pattern 315, but may settle on first angle 310 because it may be the angle that provides the highest (or nearly highest) signal-to-noise ratio and the highest (or nearly highest) received signal strength of the angles tested for signals received from client device 130 while at first location 155. Using information from first gain pattern 315, computing device 150 may determine first angle 310 relative to a first reference line 320. The vertex of first angle 310 may be congruent with first location 155.

Once computing device 150 determines first angle 310 corresponding to client device 130 in stage 220, method 200 may continue to stage 230 where computing device 150 may obtain second location 160. For example, as illustrated in FIG. 3 the vehicle may move locator device 140 down neighborhood street 305 from first location 155 to second location 160. During this location change, client device 130 may stay associated with locator access point 145. The vehicle moving locator device 140 may stop and the location of locator access point 145 may be determined. As shown in FIG. 3, the new location of locator access point 145 may comprise second location 160. The location of locator access point 145 may correspond to the center of locator access point 145's multi-antenna array. The new location (i.e., second location 160) may be determined in terms of, but is not limited to, Global Positioning System (GPS) coordinates. Computing device 150 may use a GPS tracking unit that uses the Global Positioning System to determine and track the location, for example, the center of locator access point 145's multi-antenna array.

After computing device 150 obtains second location 160 in stage 230, method 200 may proceed to stage 240 where computing device 150 may determine a second angle 325 corresponding to client device 130. Second angle 325 may be relative to second location 160 and may be determined using beamforming as described above. For example, with locator access point 145 stationary, locator access point 145 may apply beamforming using its multi-antenna array to establish a second gain pattern 330 that increases the signal strength of locator access point 145 to and from a direction toward client device 130. Using an iterative process, locator access point 145 may test a number of different angles for second gain pattern 330, but may settle on second angle 325 because it may be the angle that provides the highest (or nearly highest) signal-to-noise ratio and the highest (or nearly highest) received signal strength of the angles tested for signals received from client device 130 while at second location 160. Using information from second gain pattern 330, computing device 150 may determine second angle 325 relative to a second reference line 335. The vertex of second angle 325 may be congruent with second location 160.

Once computing device 150 determines second angle 325 in stage 240, method 200 may continue to stage 250 where computing device 150 may determine an intersection point 340 of a first directional line 345 and a second directional line 350. As shown in FIG. 3, first directional line 345 may be defined by first location 155 and first angle 310. Similarly, second directional line 350 may be defined by second location 160 and second angle 325. For example, first directional line 345 and second directional line 350 may comprise two directional vectors that may triangulate to intersection point 340.

After computing device 150 determines intersection point 340 in stage 250, method 200 may proceed to stage 260 where computing device 150 may obtain client device location 135 corresponding to intersection point 340 and thus provide the location of client device 130. The detected location of client device 130 may be compared to the service address in a billing system of the service provider for the authorized location of client device 130 to see if they are the same. If they are not the same, then it may be indicated that client device 130 is in an unauthorized location. Once computing device 150 obtains client device location 135 in stage 260, method 200 may then end at stage 270.

Figure 4:
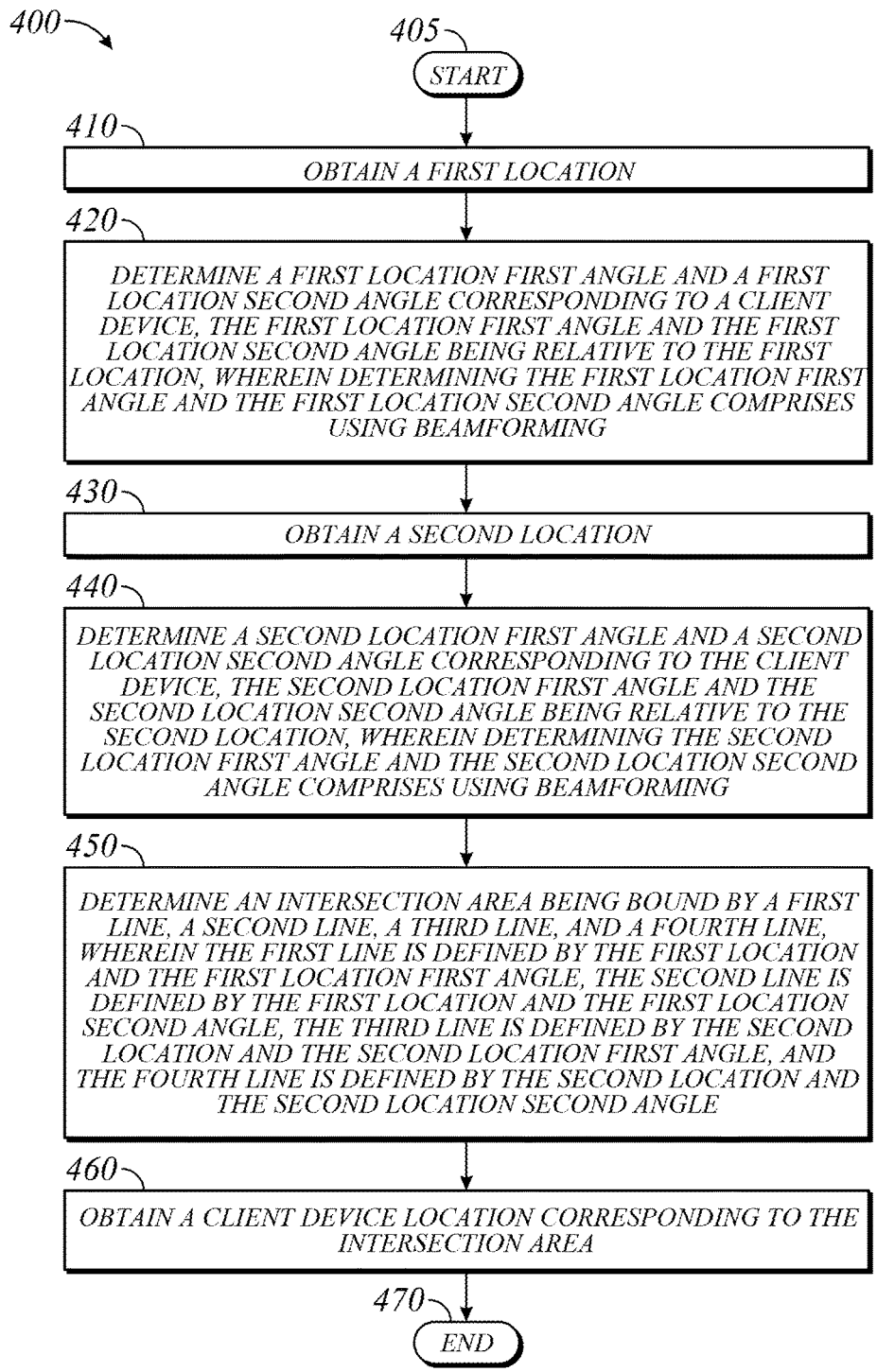
FIG. 4 is a flow chart of a method for detecting a location of a wireless device.

FIG. 4 is a flow chart setting forth the general stages involved in a method 400 consistent with an embodiment of the disclosure for detecting a location of a wireless device. Method 400 may be implemented using computing device 150 as described in more detail above with respect to FIG. 1. Ways to implement the stages of method 400 will be described in greater detail below.

Figure 5:
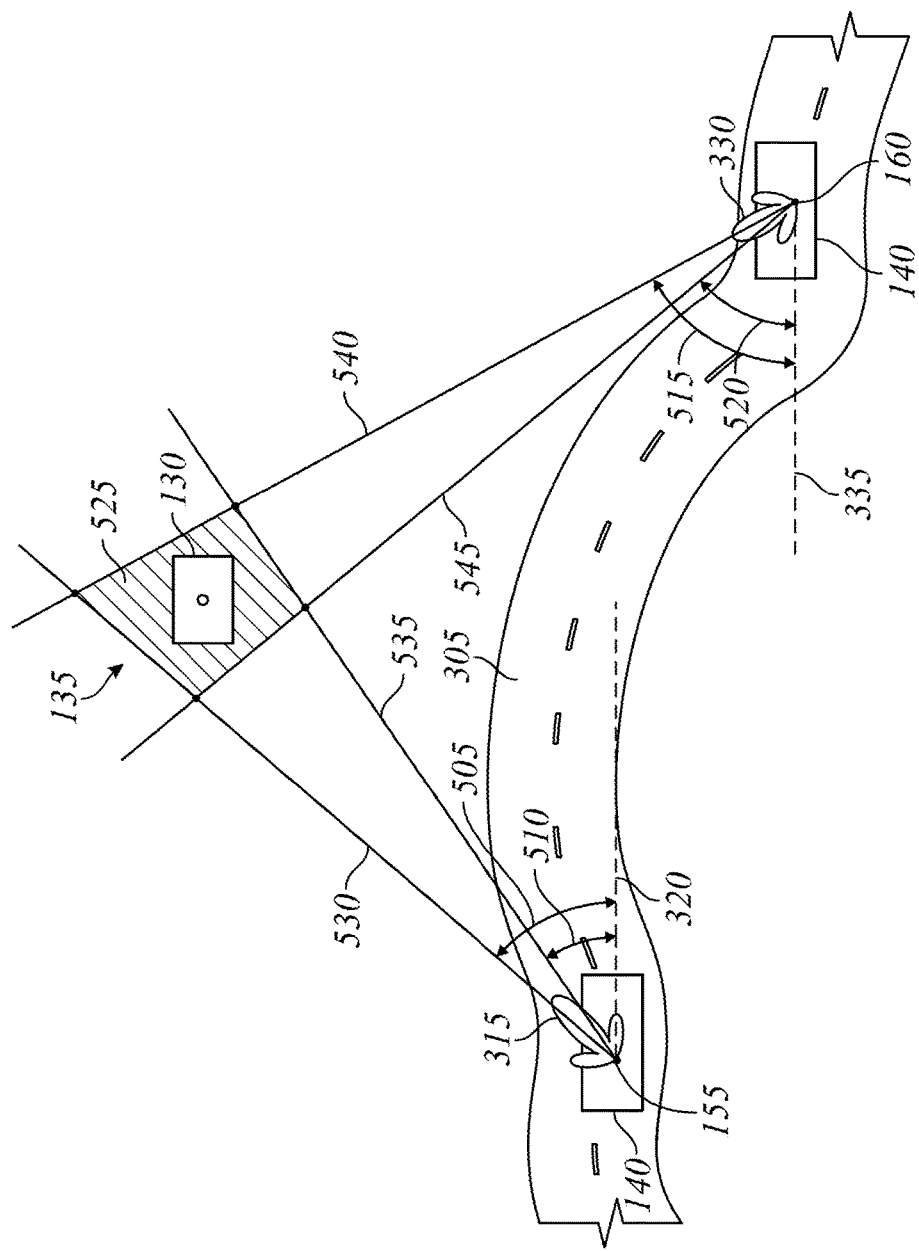
FIG. 5 is a block diagram of an operating environment.

Method 400 may begin at starting block 405 and proceed to stage 410 where computing device 150 may obtain first location 155. For example, similar to stage 210 of method 200 and as illustrated in FIG. 5, a vehicle may move locator device 140 down neighborhood street 305. Client device 130 may be placed in the "hunt mode" where it may attempt to associate with locator access point 145. For example, headend 105 may send instructions (through node 110, modem 120, and customer access point 125) to client device 130 to associate with locator access point 145. Headend 105 may send the aforementioned instructions in response to a request from computing device 150 to do so. When locator device 140 comes in range of client device 130 while client device 130 is in hunt mode, client device 130 may associate with locator access point 145. Locator access point 145 may identify client device 130 based on client device 130's client Media Access Control (MAC) address or other unique identifiers, for example, that client device 130 may supply to locator access point 145 when client device 130 associates with locator access point 145.

Once client device 130 associates with locator access point 145, the vehicle moving locator device 140 may stop and the location of locator access point 145 may be determined. As shown in FIG. 5, the location of locator access point 145 may comprise first location 155. The location of locator access point 145 may correspond to a center of locator access point 145's multi-antenna array. The location (i.e., first location 155) may be determined in terms of, but is not limited to, Global Positioning System (GPS) coordinates. Computing device 150 may use a GPS tracking unit that uses the Global Positioning System to determine and track the location, for example, the center of locator access point 145's multi-antenna array.

From stage 410, where computing device 150 obtains first location 155, method 400 may advance to stage 420 where computing device 150 may determine a first location first angle 505 and a first location second angle 510 corresponding to client device. First location first angle 505 and first location second angle 510 may be relative to first location 155. First location first angle 505 and first location second angle 510 may be determined using beamforming. As described above, beamforming is a process that performs adaptive spatial signal processing with an array of transmitters or receivers. Signals from the array may be combined in a manner that increases the signal strength to and from a particular desired direction while signals to and from other directions may be combined destructively. This results in degradation of the signal to and from the undesired direction, while increasing the signal in the desired direction.

With locator access point 145 stationary, locator access point 145 may apply beamforming using its multi-antenna array to establish first gain pattern 315 that increases the signal strength of locator access point 145 to and from a direction toward client device 130. Using an iterative process, locator access point 145 may test a number of different angles pointing towards client device 130, but may settle on a particular direction because it may provide the highest (or nearly highest) signal-to-noise ratio and the highest (or nearly highest) received signal strength of the angles tested for signals received from client device 130 while at first location 155. In this embodiment, rather than one angle, a range of angles between a maximum (e.g., first location first angle 505) and a minimum (e.g., first location second angle 510) may be provided by locator access point 145 corresponding to first gain pattern 315. The range of angles may represent a probability. For example, there may be a probabilistic certainty (e.g., a 99% chance) that client device 130 is between the maximum and minimum angles. The range of angles may be calculated to achieve the desired certainty. Using information from first gain pattern 315, computing device 150 may determine first location first angle 505 and first location second angle 510 relative to first reference line 320. The vertex of first location first angle 505 and the vertex of first location second angle 510 may be congruent with first location 155.

Once computing device 150 determines first location first angle 505 and first location second angle 510 in stage 420, method 400 may continue to stage 430 where computing device 150 may obtain second location 160. For example, as illustrated in FIG. 5 the vehicle may move locator device 140 down neighborhood street 305 from first location 155 to second location 160. During this location change, client device 130 may stay associated with locator access point 145. The vehicle moving locator device 140 may stop and the location of locator access point 145 may be determined. As shown in FIG. 5, the new location of locator access point 145 may comprise second location 160. The location of locator access point 145 may correspond to the center of locator access point 145's multi-antenna array. The new location (i.e., second location 160) may be determined in terms of, but is not limited to, Global Positioning System (GPS) coordinates. Computing device 150 may use a GPS tracking unit that uses the Global Positioning System to determine and track the location, for example, the center of locator access point 145's multi-antenna array.

After computing device 150 obtains second location 160 in stage 430, method 400 may proceed to stage 440 where computing device 150 may determine a second location first angle 515 and a second location second angle 520 corresponding to client device 130. Second location first angle 515 and second location second angle 520 may be relative to second location 160. Second location first angle 515 and second location second angle 520 may be determined using beamforming. As described above, beamforming is a process that performs adaptive spatial signal processing with an array of transmitters or receivers. Signals from the array may be combined in a manner that increases the signal strength to and from a particular desired direction while signals to and from other directions may be combined destructively. This results in degradation of the signal to and from the undesired direction, while increasing the signal in the desired direction.

With locator access point 145 stationary, locator access point 145 may apply beamforming using its multi-antenna array to establish second gain pattern 330 that increases the signal strength of locator access point 145 to and from a direction toward client device 130. Using an iterative process, locator access point 145 may test a number of different angles pointing towards client device 130, but may settle on a particular direction because it may provide the highest (or nearly highest) signal-to-noise ratio and the highest (or nearly highest) received signal strength of the angles tested for signals received from client device 130 while at second location 160. In this embodiment, rather than one angle, a range of angles between a maximum (e.g., second location first angle 515) and a minimum (e.g., second location second angle 520) may be provided by locator access point 145 corresponding to second gain pattern 330. Using information from second gain pattern 330, computing device 150 may determine second location first angle 515 and second location second angle 520 relative to second reference line 335. The vertex of second location first angle 515 and the vertex of second location second angle 520 may be congruent with first location 160.

Once computing device 150 determines second location first angle 515 and second location second angle 520 in stage 440, method 400 may continue to stage 450 where computing device 150 may determine an intersection area 525 being bound by a first directional line 530, a second directional line 535, a third directional line 540, and a fourth directional line 545. First directional line 530 may be defined by first location 155 and first location first angle 505, second directional line 535 may be defined by first location 155 and first location second angle 510, third directional line 540 may be defined by second location 160 and second location first angle 515, and fourth directional line 545 may be defined by second location 160 and second location second angle 520. For example, intersection area 525 may comprise a quadrilateral formed by intersections of first directional line 530, second directional line 535, third directional line 540, and fourth directional line 545.

After computing device 150 determines intersection area 525 in stage 450, method 400 may proceed to stage 460 where computing device 150 may obtain client device location 135 corresponding to intersection area 525 and thus provide the location of client device 130. For example, the detected location of client device 130 indicated by intersection area 525 may be compared to the service address in the billing system of the service provider for the authorized location for client device 130 to see if they are the same. If they are not the same, then it may be indicated that client device 130 is in an unauthorized location. Once computing device 150 obtains the client device location in stage 460, method 400 may then end at stage 470.

Intersection area 525 may be too large to determine client device 130's location because intersection area 525, for example, may encompass may addresses, businesses, residences, etc. Consistent with embodiments of the disclosure, if intersection area 525 is too large to determine client device 130's location, locator device 140 may be moved closer to intersection area 525 and the process of method 400 may be repeated. This movement may generate a newer, smaller intersection area 525. This may be repeated until intersection area 525 is small enough to determine client device 130's location.

Consistent with embodiments of the disclosure, a third dimension may be introduced to the aforementioned processes. For example, the aforementioned processes may be expanded to distinguish a vertical dimension that may distinguish authorized locations in a vertical direction. In other words, authorized locations in different floors of an apartment building or condominium may be distinguished by embodiments of the disclosure. Moreover, additional embodiments of the disclosure may be similar to those described above, but may use a directional antenna (e.g., a dish antenna) instead of a beamforming antenna array to determine angles and locations.

Figure 6:
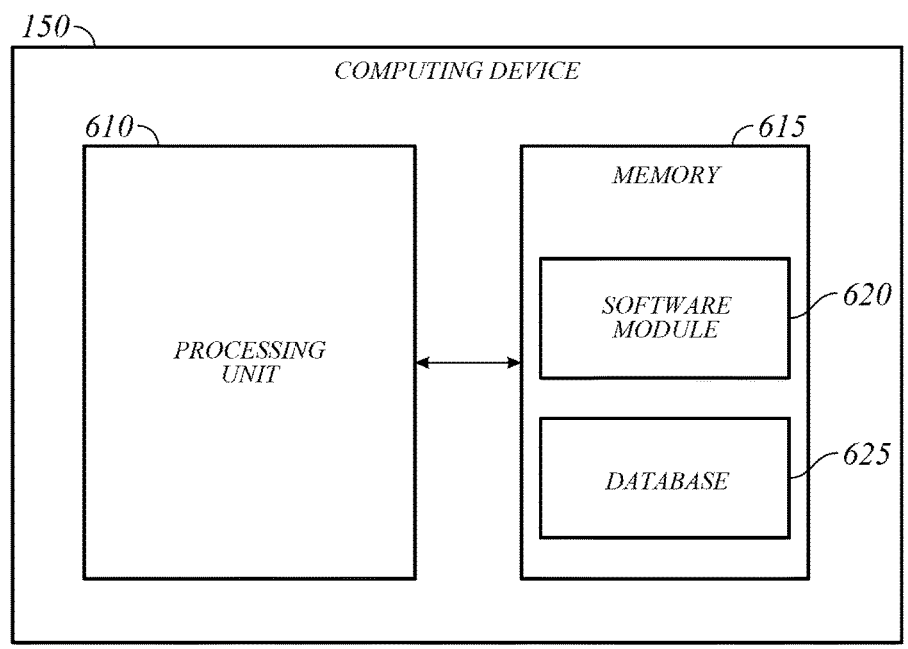
FIG. 6 is a block diagram of a computing device.

FIG. 6 shows computing device 600. As shown in FIG. 6, computing device 600 may include a processing unit 610 and a memory unit 615. Memory unit 615 may include a software module 620 and a database 625. Database 625 may comprise and/or include, but is not limited to, the lookup table. While executing on processing unit 610, software module 620 may perform, for example, processes for providing input level alignment, processes for providing per-port performance optimization, and processes for providing thermal compensation, including for example, any one or more of the stages from method 300 described above with respect to FIG. 3, any one or more of the stages from method 400 described above with respect to FIG. 4, or any one or more of the stages from method 500 described above with respect to FIG. 5. Computing device 600, for example, may provide an operating environment for control unit 210. Control unit 210 may operate in other environments and is not limited to computing device 600.

Computing device 600 may be implemented using a personal computer, a network computer, a mainframe, a router, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    determining, by a locator device from a first location, a first angle from a first reference line to a client device, wherein determining the first angle comprises;
        establishing, for a multi-antenna array corresponding to a locator access point, a first gain pattern that increases a signal strength of the locator access point to and from a direction toward the client device, testing a first plurality of different angles for the first gain pattern and determining a signal-to-noise ratio and received signal strength received from the client device for each of the first plurality of different angles, and selecting the first angle from the first plurality of different angles, the first angle having at least one of the following: a highest signal-to-noise ratio of the first plurality of different angles; and a highest received signal strength of the first plurality of different angles;

determining, by the locator device from a second location, a second angle from a second reference line to the client device, wherein the first reference line and the second reference line being parallel, wherein determining the second angle comprises;

establishing, for the multi-antenna array corresponding to the locator access point, a second gain pattern that increases a signal strength of the locator access point to and from a direction toward the client device, testing a second plurality of different angles for the second gain pattern and determining a signal-to-noise ratio and received signal strength received from the client device for each of the second plurality of different angles, and selecting the second angle from the second plurality of different angles, the second angle having at least one of the following: a highest signal-to-noise ratio of the second plurality of different angles; and a highest received signal strength of the second plurality of different angles;

determining an intersection point of a first directional line and a second directional line, the first directional line being defined by the first location and the first angle, the second directional line being defined by the second location and the second angle; and obtaining a client device location corresponding to the intersection point.

2. The method of claim 1, further comprising obtaining the first location wherein obtaining the first location comprises obtaining the first location corresponding to a locator access point to which the client devices has associated.

3. The method of claim 1, further comprising obtaining the second location wherein obtaining the second location comprises obtaining the second location corresponding to a locator access point to which the client devices has associated.

4. The method of claim 1, further comprising issuing a command to the client device to associate with a locator access point.

5. The method of claim 4, further comprising allowing the client device to associate with the locator access point in response to the command.

6. A method comprising:

determining, from a first location, a first location first angle from a first reference line to a client device and a first location second angle from the first reference line to the client device, wherein determining the first location first angle and the first location second angle comprises using beamforming wherein using beamforming comprises an iterative process for determining the first location first angle and the first location second angle by testing signal-to-noise ratio and received signal strength for a furst number of different angles;

determining, from a second location, a second location first angle from a second reference line to the client device and a second location second angle from the second reference line to the client device, wherein determining the second location first angle and the second location second angle comprises using beamforming, the first reference line and the second reference line being parallel, wherein using beamforming comprises an iterative process for determining the second location first angle and the second location second angle by testing signal-to-noise ratio and received signal strength for a second number of different angles;

determining an intersection area being bound by a first directional line, a second directional line, a third directional line, and a fourth directional line, wherein the first directional line is defined by the first location and the first location first angle, the second directional line is defined by the first location and the first location second angle, the third directional line is defined by the second location and the second location first angle, and the fourth directional line is defined by the second location and the second location second angle; and obtaining a client device location corresponding to the intersection area.

7. The method of claim 6, further comprising obtaining the first location wherein obtaining the first location comprises obtaining the first location corresponding to a locator access point to which the client devices has associated.

8. The method of claim 7, wherein determining the first location first angle and the first location second angle using beamforming comprises:

determining the first location first angle comprising one angle in a band of angles of a first beamforming gain pattern that the locator access point uses to communicate with the client device from the first location; and determining the first location second angle comprising another angle in the band of angles of the first beamforming gain pattern that the locator access point uses to communicate with the client device from the first location.

9. The method of claim 6, further comprising obtaining the second location wherein obtaining the second location comprises obtaining the second location corresponding to a locator access point to which the client devices has associated.

10. The method of claim 9, wherein determining the second location first angle and the second location second angle using beamforming comprises:

determining the second location first angle comprising one angle in a band of angles of a second beamforming gain pattern that the locator access point uses to communicate with the client device from the second location; and determining the second location second angle comprising another angle in the band of angles of the second beamforming gain pattern that the locator access point uses to communicate with the client device from the second location.

11. The method of claim 6, further comprising issuing a command to the client device to associate with a locator access point.

12. The method of claim 11, further comprising allowing the client device to associate with the locator access point in response to the command.

13. A system comprising:

a memory storage; and a processing unit coupled to the memory storage, wherein the processing unit is operative to:

allow a client device to associate with a locator access point in response to a command, determine, from a first location, a first angle from a first reference line to the client device, wherein the processing unit being operative to determine the first angle comprises the processing unit being operative to, establish, for a multi-antenna array, a first gain pattern that increases a signal strength to and from a direction toward the client device, test a first plurality of different angles for the first gain pattern and determining a signal-to-noise ratio and received signal strength received from the client device for each of the first plurality of different angles, and select the first angle from the first plurality of different angles, the first angle having at least one of the following: a highest signal-to-noise ratio of the first plurality of different angles; and a highest received signal strength of the first plurality of different angles;

determine, from a second location, a second angle from a second reference line to the client device, the first reference line and the second reference line being parallel, wherein the processing unit being operative to determine the second angle comprises the processing unit being operative to, establish, for the multi-antenna array, a second gain pattern that increases a signal strength to and from a direction toward the client device, test a second plurality of different angles for the second gain pattern and determining a signal-to-noise ratio and received signal strength received from the client device for each of the second plurality of different angles, and select the second angle from the second plurality of different angles, the second angle having at least one of the following: a highest signal-to-noise ratio of the second plurality of different angles; and a highest received signal strength of the second plurality of different angles;

determine an intersection point of a first directional line and a second directional line, the first directional line being defined by the first location and the first angle, the second directional line being defined by the second location and the second angle, and obtain a client device location corresponding to the intersection point.

14. The system of claim 13, wherein the first location corresponds to the locator access point to which the client devices has associated.

15. The system of claim 13, wherein the second location corresponds to the locator access point to which the client devices has associated.

16. The system of claim 13, wherein the processing unit is further operative to issue the command to the client device to associate with the locator access point.

* * * * *